Figure 1:
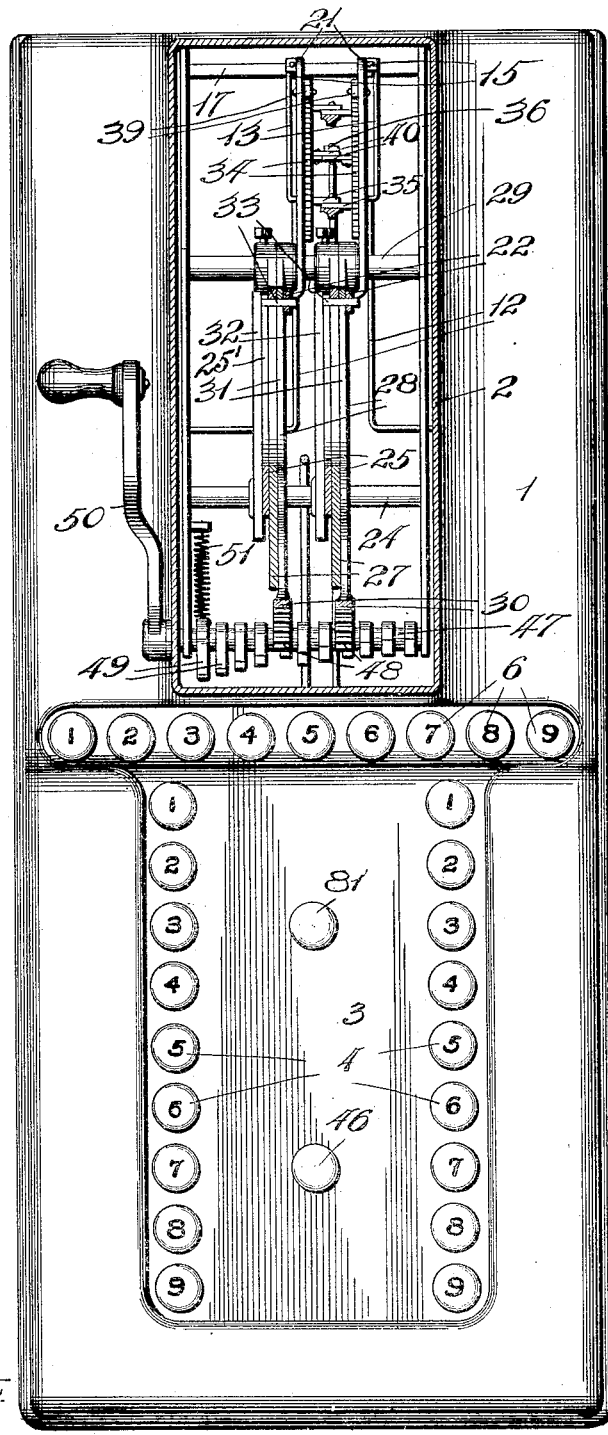

J. P. CLULEY.
MULTIPLYING MACHINE.
APPLICATION FILED JAN. 25, 1909. RENEWED OCT. 23, 1911.

1,221,027.

Patented Apr. 3, 1917.
6 SHEETS—SHEET 1.

ATTEST.
E. M. Harrington.
J. S. Cook.

INVENTOR.
J. P. CLULEY.
BY

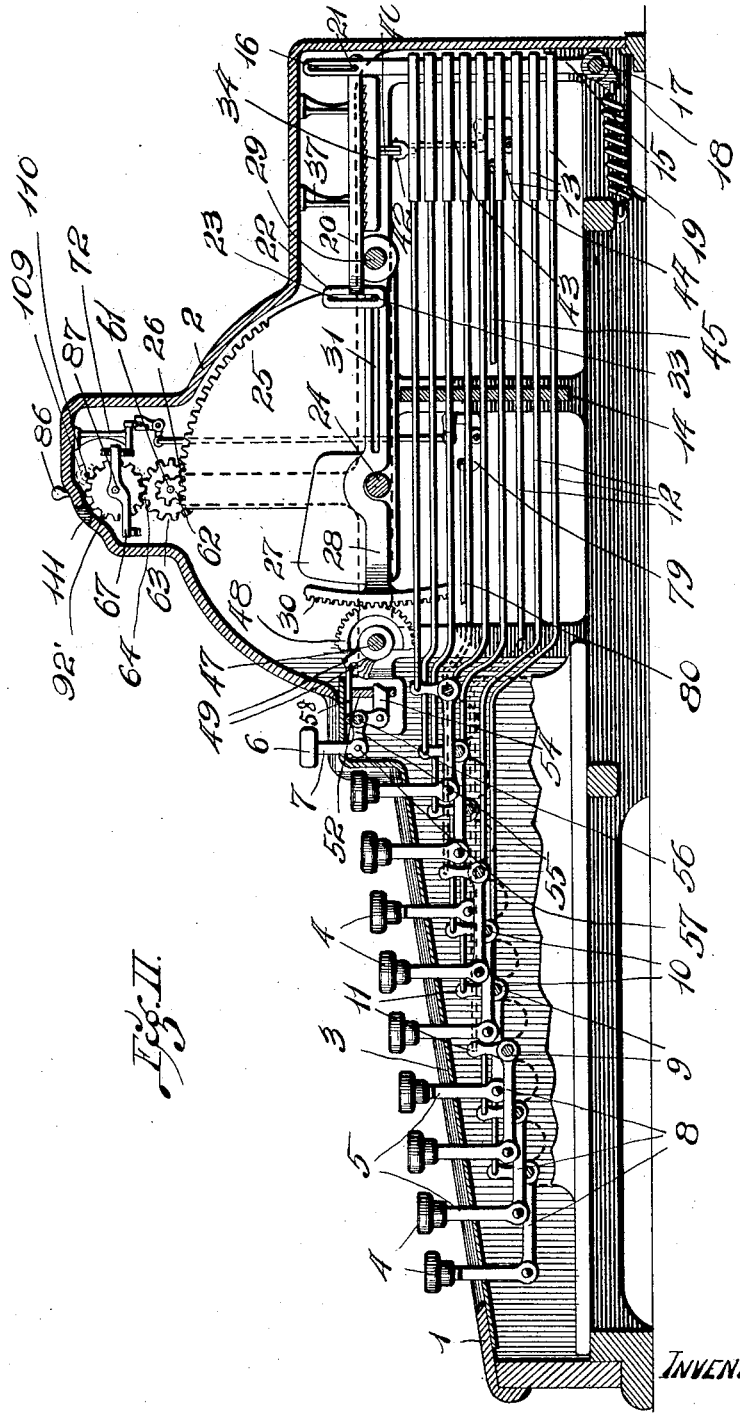

J. P. CLULEY.
MULTIPLYING MACHINE.
APPLICATION FILED JAN. 25, 1909. RENEWED OCT. 23, 1911.
1,221,027.
Patented Apr. 3, 1917.
6 SHEETS—SHEET 3.
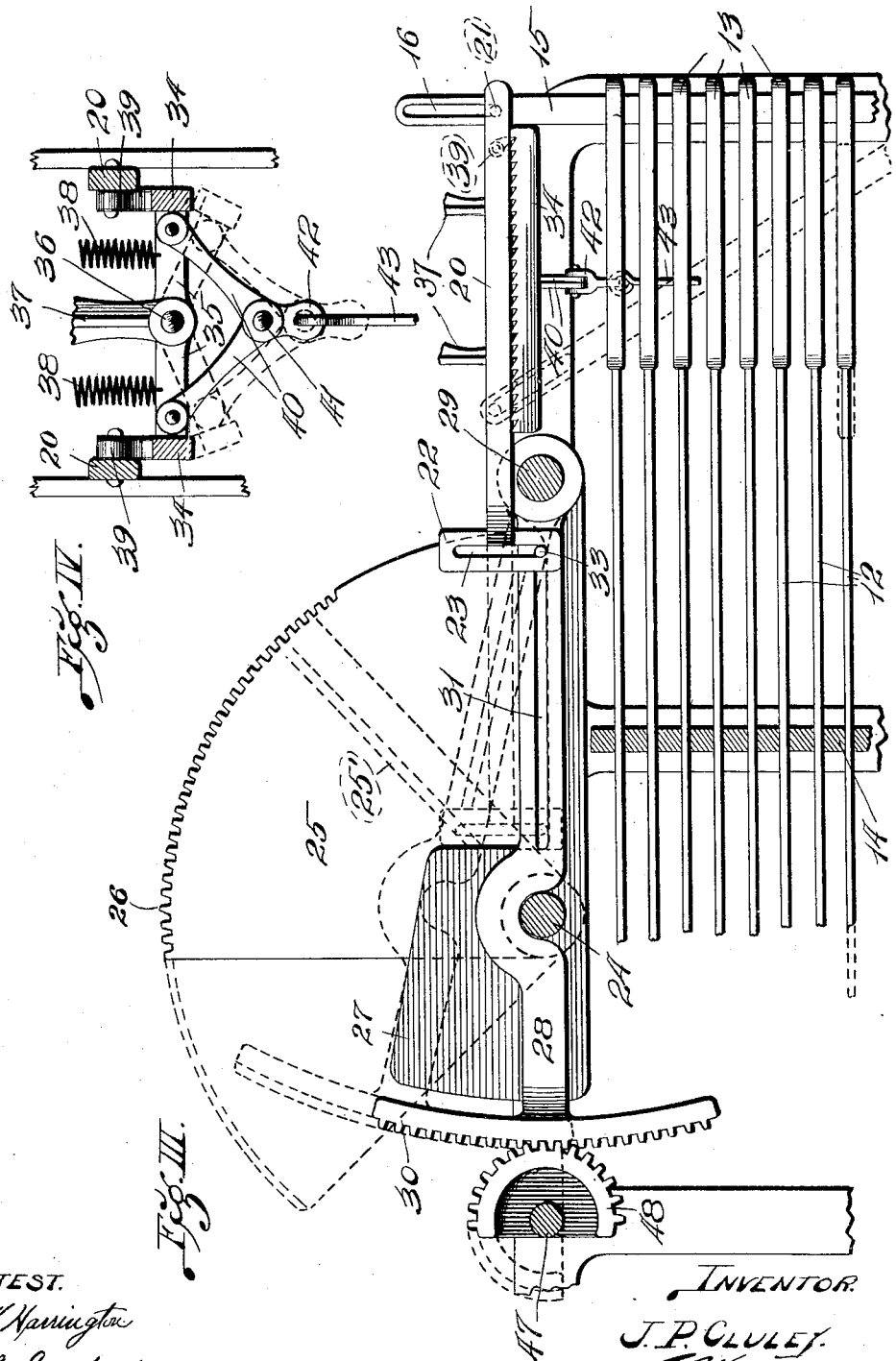

J. P. CLULEY.
MULTIPLYING MACHINE.
APPLICATION FILED JAN. 25, 1909. RENEWED OCT. 23, 1911.
1,221,027.
Patented Apr. 3, 1917.
6 SHEETS—SHEET 4.
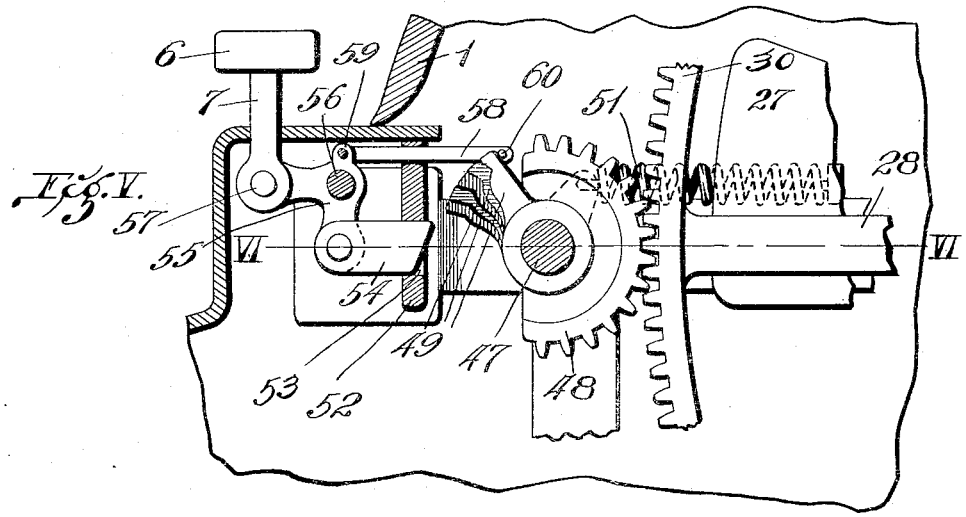
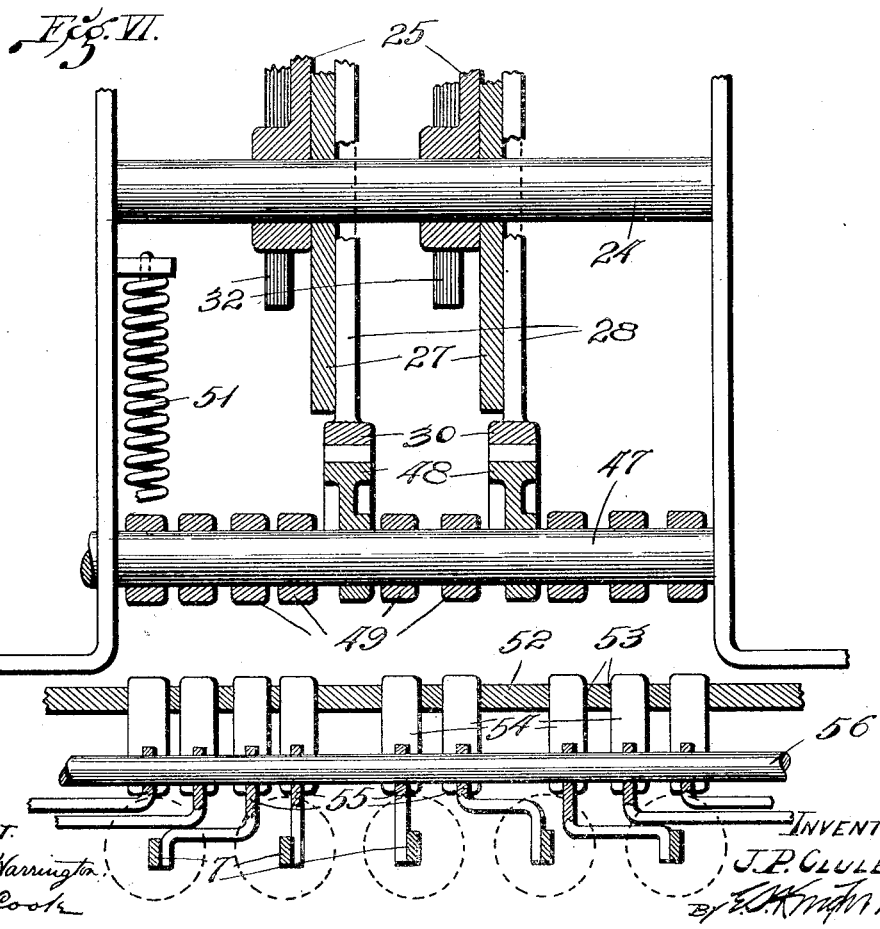

J. P. CLULEY.
MULTIPLYING MACHINE.
APPLICATION FILED JAN. 25, 1909. RENEWED OCT. 23, 1911.
1,221,027.
Patented Apr. 3, 1917.
6 SHEETS—SHEET 5.
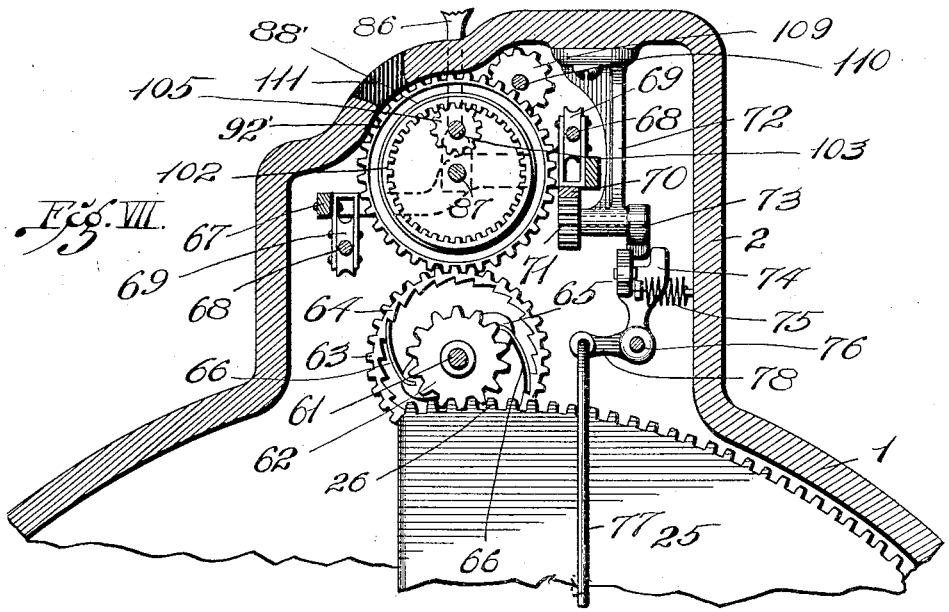
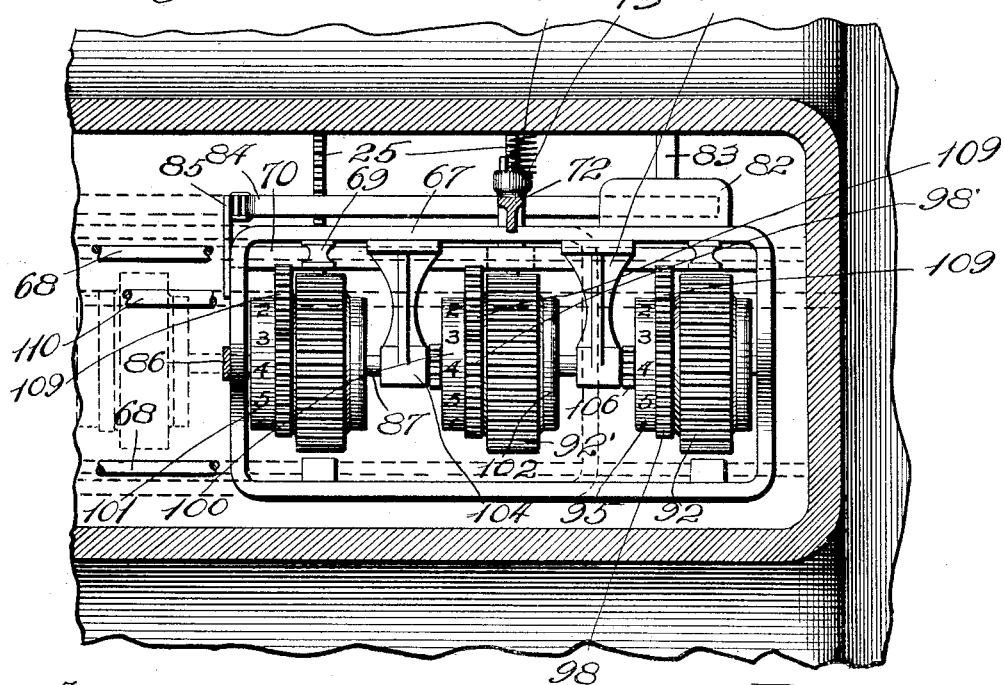

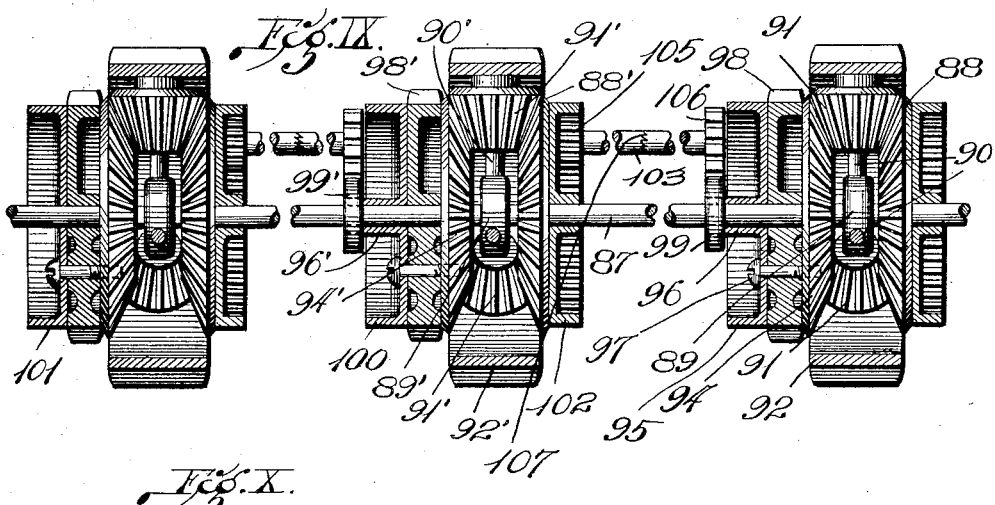
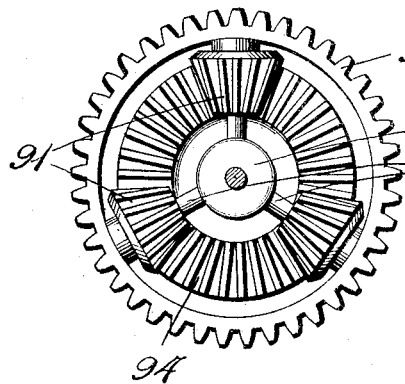
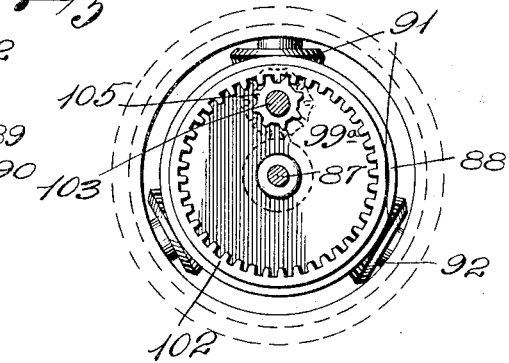
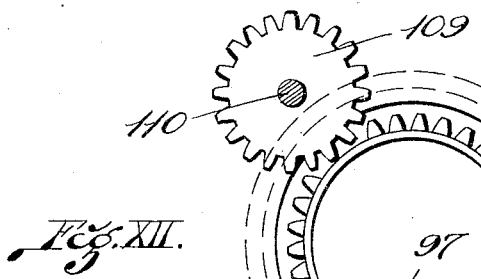

UNITED STATES PATENT OFFICE.

JOHN P. CLULEY, OF ST. LOUIS, MISSOURI, ASSIGNOR TO CLULEY MULTIPLIER COMPANY, OF GREEN BAY, WISCONSIN, A CORPORATION OF DELAWARE.

MULTIPLYING-MACHINE.

1,221,027. Specification of Letters Patent. Patented Apr. 3, 1917.

Application filed January 25, 1909, Serial No. 474,091. Renewed October 23, 1911. Serial No. 656,217.

*To all whom it may concern:*

Be it known that I, JOHN P. CLULEY, a citizen of the United States of America, residing at the city of St. Louis, in the State of Missouri, have invented certain new and useful Improvements in Multiplying-Machines, of which the following is a full, clear, and exact description, reference being had to the accompanying drawings, forming part of this specification.

My invention relates to computing machines.

One of the objects of the invention is to provide mechanism for performing mathematical calculations in a very direct manner and in a manner more closely analogous to the usual mental processes than heretofore employed. In the case of multiplication, for example, in the so-called multiplying machines now on the market, the product of two numbers is usually obtained by indirect methods based on a long series of additions. My invention, in its broad aspects, provides for direct multiplication. Similarly, the other mathematical processes which fall within the scope of the invention are performed directly rather than indirectly, with a corresponding increase in the speed of operation.

Another object of the invention is to provide a computing mechanism in which the movements of the various parts are accurately defined and positive, thereby eliminating the possibility of error in the calculations. Another object is to provide a device, the efficient and accurate operation of which requires a minimum of mental and physical effort on the part of the operator, whereby the employment of operators having special skill and experience is not called for.

A further object is to provide a device having parts which are strong and simple, which may be readily stamped from sheet metal, and which coöperate easily and smoothly, whereby said device may be economically manufactured, and whereby it is not likely to get out of order when subjected to hard usage by incompetent persons, but whereby the parts, if damaged, may be readily replaced.

Another object is to provide a novel transfer mechanism adapted especially to carry numbers in excess of 1.

A further object is to provide a computing mechanism which is not limited in its application to the decimal system.

An additional object is to provide, in effect, a single means or device for determining, for any given order, the multiples of all digits. In this respect my invention is distinguished from those mechanisms in which it is necessary to provide nine multiple determining means for each order; namely, one means or device for determining the desired multiples of the various digits from 1 to 9 inclusive. In this latter type of apparatus it is necessary to provide selecting mechanism to select any one of the nine multiple determining devices referred to. On the other hand, in carrying out certain phases of my invention I am enabled to dispense with this selective feature and also to reduce the number of multiple determining devices from 9 to 1.

Other objects will be apparent from the description hereinafter given.

The principles of the invention are adapted for very broad and general application. Accordingly, many different mechanisms and devices may be designed which embody these principles. For the purpose of disclosing the invention, I have illustrated in the accompanying drawings and described in the specification one embodiment thereof. This embodiment assumes the form of a "multiplying machine." I have termed it a "multiplying machine" to distinguish it from a machine which merely adds. The machine, however, is also capable of performing addition, subtraction, division and other mathematical operations.

Referring to the drawings:

Figure I is in part a top or plan view of my machine and in part a horizontal section through the casing and the operating mechanism.

Fig. II is a vertical longitudinal section of the machine.

Fig. III is an enlarged view, partly in elevation and partly in vertical longitudinal section of the key actuated mechanism.

Fig. IV is an enlarged vertical cross section through the rack and dog mechanism by which the shifter that is actuated by the multiplicand keys is controlled.

Fig. V is an enlarged view, partly in section and partly in elevation of one of the multiplier keys and the mechanism controlled by the multiplier keys.

Fig. VI is an enlarged horizontal section taken on the line VI—VI, Fig. V.

Fig. VII is an enlarged cross section taken through the upper portion of the casing of the machine and the counting wheel mechanism.

Fig. VIII is an enlarged view showing the upper portion of the casing of the machine in horizontal section and the counting wheel mechanism and its carriage in top or plan view.

Fig. IX is an enlarged longitudinal section taken through the counting wheel mechanism.

Fig. X is a side elevation of one of the transfer wheels of the counting wheel mechanism, one of the main bevel wheels associated with said transfer wheel, and the pinions that coöperate with said bevel wheel.

Fig. XI is an elevation of the carrying mechanism.

Fig. XII is an elevation of the resetting mechanism.

The machine illustrated in the various figures referred to is provided with a key board comprising a number of rows of keys, adapted to be depressed to set up a multiplicand, and a separate row of keys adapted to be depressed one at a time and corresponding to the various digits of the multiplier. The operation in general is accomplished by depressing first the multiplicand keys to set up the digits from right to left; that is to say, the digit of the lowest order is set up first followed by the digits of the successive higher orders. The multiplier digits are then struck, the digit of the lowest order likewise being struck first followed by the digits of the successive higher orders. Certain manual operations are also performed after striking each multiplier digit, whereby the entire multiplicand is multiplied first by the multiplier digit of the lowest order and then multiplied by the digit of the next highest order and so on, exactly as is the case where multiplication is effected by writing the various digits in long hand and then multiplying successively by one digit at a time, beginning with the right hand digit. One difference between the long hand process and the process carried out by this machine is that in the former, the partial products are all added together as a separate step, after said partial products have been written down. In the machine, however, an accumulator is provided, whereby each partial product, as soon as obtained, is automatically added to the preceding total, so that after obtaining the last partial product the total represents the total of all partial products, and hence the desired product of the entire multiplicand by the entire multiplier.

The machine illustrated is preferably provided with a suitable casing 1, which may be of any desired configuration. It is provided with an upwardly extending central portion 2 surmounting the lower and rearmost base portion thereof, and is provided at its forward end with a keyboard 3.

*Keyboard mechanism.*

4 designates the multiplicand keys, having stems 5 operable in said keyboard, and 6 are the multiplier keys, having stems 7 also operable in said keyboard. There are as many banks of multiplicand keys 4 employed in my machine bearing the numerals "1" to "9," inclusive, as will correspond to the number of key actuated mechanisms; and inasmuch as I have illustrated only two of such key actuated mechanisms in the drawings, I have shown only two banks of multiplicand keys for utility in placing the two key actuated mechanisms in condition for operation. Any greater number of the key actuated mechanisms may, however, be employed, in which event the banks of multiplicand keys and the connections between them and the counting wheel mechanisms would be properly increased. The bank of multiplier keys extends transversely of the keyboard 3 and said keys serve to actuate means whereby the operation of the key actuated mechanisms may be controlled, as will hereinafter appear.

The stem 5 of my multiplicand key 4 is pivoted beneath the keyboard 3 to an arm 8 of a bell crank lever 9 corresponding to said key. Each bell crank lever is pivoted to a supporting rod 10 provided therefor and mounted in the casing 1. Each bell crank lever is provided with a rear arm 11 arranged at an angle to the arm 8 and to which is pivoted a connecting or draw rod 12 extending longitudinally of the machine from the bell crank to the rear end of the machine. The several connecting rods 12 operate loosely in a guide 14 extending transversely within the casing 1, (see Figs. II and III,) and the connecting rods are provided at their rear ends with loops 13, (see Figs. I to III, inclusive). The several connecting rods 12 associated with either bank of multiplicand keys 4 and their loops 13 are arranged in a vertical series.

*Multiplying mechanism.*

15 designates an upright throw lever that extends through the entire series of connecting rod loops 13 associated with one of the banks of multiplicand keys, and which is pivoted at its lower end to a support 17. There is a similar throw lever associated with the other series of connecting rod loops in the machine. Each throw lever is provided at its lower end with an arm 18 to which is connected a retracting spring 19 that serves to return the throw lever to an upward position after it has been moved forwardly by actuation of either of the connecting rods 12 upon the depression of either of the multiplicand keys 4. In each throw lever, at its upper end, is a slot 16 that extends longitudinally of the throw lever.

20 designates shifting bars arranged horizontally above the series of connecting rods 12 and each of which is provided with a pin 21 that is operable in the slot 16 in the throw lever 15 to which said shift bar corresponds, and whereby the shift bar is moved in a forward direction in the machine upon the depression of either the multiplicand keys 4 and the forward movement of the throw lever by the actuation of the connecting rod 12 associated with said key. The shift bars are provided at their forward ends with heads 22 containing vertical slots 23.

24 designates a supporting shaft mounted in the sides of the casing 1 and extending transversely of the machine within said casing. 25 are multiplier gear members loosely fitted to the supporting shaft 24. These multiplier gear members are preferably of segmental shape, as seen in Figs. II and III, and each gear member is provided at its upper edge with teeth 26 that mesh with a member to be hereinafter more particularly referred to. Alongside of each multiplying gear member 25 and separated therefrom by a distance piece 27 is a lift lever 28 that is pivoted to a supporting shaft 29 located back of the supporting shaft 24 and at the forward free end of which is a vertical segment rack 30. In the rear portion of the lift lever is a longitudinal slot 31 which coincides with a similar slot 25' in the multiplying gear member 25, (see Fig. I and dotted lines Fig. III,). At the side of the gear member 25 opposite that at which each lift lever 28 is located is a pin carrying bar 32, (see Fig. I,) that is slidably and rotatably fitted to the supporting shaft 24 and is provided with a pin 33 operable in the slot 25' in the multiplying gear member 25 and the slot 31 in the lift lever 28. This pin also extends into the slot 23 in the head of the shift bar 20 located adjacent to the lift lever and multiplying gear member, thereby providing for the forward movement of said pin 33 in the slots in the lift lever and multiplying gear member in order that the pin may be moved toward the axis of the multiplying gear member to a degree determined by the degree of forward movement of the shift bar 20 when it is actuated by the throw lever 15. The degree of forward movement of the throw lever 15 and consequently of the pin 33 under the influence of the shift bar 20 is determined according to the multiplicand key 4 that is depressed. In this connection, it will be noted by reference to Fig. I that the multiplicand keys are arranged numerically with the key of the smallest value, namely that bearing the numeral "1", located at the innermost end of the keyboard and the key of the highest value, namely "9", located at the outer or lower end of the keyboard. It will also be observed on referring to Fig. II that the keys of the smaller value have attached to them the connecting rods 12 that are uppermost in the series of said rods and the loops 13 of which are farthest removed from the point of pivotal support of the throw lever 15. The succeeding and multiplicand keys have attached to them the lower connecting rods, the loops of which are located nearer the point of pivotal support of the throw lever 15. It will be seen in view of the foregoing that when the numeral "1" key is depressed, the connecting rod 12 associated with this key will be moved forwardly to the same degree as the rods 12 beneath it may be moved, but as a consequence the throw lever 15 and the shift bar 20 will be moved in one-ninth of their maximum movement to cause said throw lever to impart the proper movement of the pin 33 toward the axis of the multiplying gear member 25. It will also be readily understood that when the multiplicand keys of higher value than the numeral "1" key are depressed, there will be greater movement of the parts actuated thereby, the greatest movement being that occasioned by the depression of the numeral "9" key.

It is essential that the shift bars 20 be retained in a forward position after they have been shifted by the actuation of the throw lever 15, and to provide for the retention of the shift bars, I employ the following mechanism:

34 are ratchet bars located in juxtaposition to and at a lower level than the shift bars 20 and which are supported by arms 35 attached to the ratchet bars and pivoted at their inner ends at 36, (see Fig. IV,) to hangers 37 depending from the top of the casing 1 near its rear end, (see Fig. II.) The ratchet bars 34 are normally supported in a horizontal position by springs 38.

39 are pawls pivoted to the shift bars 20 and adapted to engage the teeth of the ratchet bars 34. These pawls move forwardly with the shift bars and by engagement with the teeth of the ratchet bars act to retain the shift bars from retrograde movement after they have been actuated by the throw levers 15. To provide for the release of the shift bars and their return in a rearward direction, I utilize means for lowering the ratchet bars 34 out of engagement with the pawls 39, and which comprise links 40 pivoted to the arms 35 and to each other at 41. These links have attached to them at their point of pivotal connection an eye 42 to which is connected a pull rod 43, (see Figs. II to IV, inclusive.) The pull rod 43 is connected to a bell crank lever 44, (see Fig. II,) that also has attached to it a connecting rod 45. This connecting rod 45 extends forwardly in the machine to a release key 46, (see Fig. I,) to the stem of which the connecting rod is attached in a manner to provide for the actuation of said rod similar to the actuation of the connecting rod 12 to occasion the lowering of the ratchet bars 34 for the purpose previously stated.

The lift levers 28 by which the multiplying gear members 25 are actuated after the shift bars 20 have been moved forwardly and the pins 33 have been moved by said shift bars toward the axes of said multiplying gear members, are operated by mechanism to be next described and which is controlled by the multiplying key 6. 47 designates a shaft extending transversely of the machine in front of the segment rack 30 carried by the lift lever 28 and which is journaled in the sides of the casing 1. This shaft has fixed to it gears 48, preferably of segment shape, that are arranged in mesh with the segment racks 30. It also has fixed to it a series of stop arms 49 arranged in staggered relation to each other along the shaft and which are adapted to be moved into engagement with members actuated by the multiplying keys, as will presently appear, whereby rotation of the shaft 47 in different degrees may be controlled according to the multiplying key that is depressed; that is to say, the arrangement of the stop arms 49 is such as to provide for only a restricted rotation of the shaft 47 when the numeral "1" multiplying key is depressed and increasing degrees of rotation of the shaft when the following multiplying keys bearing the numerals "2" to "9" are depressed.

*Manual actuating mechanism.*

The shaft 47 has fixed to it, exterior of the casing of the machine, a hand lever 50, (see Fig. I,) by which the shaft may be rotated to move the stop arms 49 forwardly and downwardly, and when this hand lever is released, the shaft is rotated backwardly to move the stop arms to their normal positions by a retracting spring 51, (see Figs. I, V, and VI.) Immediately in front of the shaft 47 and extending transversely of the machine is a guide 52 that is provided with a plurality of openings 53 corresponding in number to the number of multiplying keys and stop arms 49. 54 are dogs operable in the openings in the guide 52 and pivoted to bell crank levers 55 loosely mounted upon a transverse supporting rod 56, and each of which is pivoted at 57 to the stem 7 of the multiplying key 6 corresponding thereto. Whenever one of the multiplying keys is depressed, the dog 54 associated therewith is moved rearwardly in the guide 52 to cause it to occupy a position in the path of travel of the stop arm 49 corresponding thereto when the shaft 47 is rotated. As a consequence said dog serves to limit the degree of rotation of said shaft according to the multiplying key that is depressed with the result of restricting the degree to which a lift lever 28 may be elevated through the medium of a gear 48 to actuate the multiplying gear member 25. The multiplying key, after being depressed, is raised to its normal position when released upon the return movement of the shaft 47 and through the medium of a pull rod 58. There is an individual pull rod 58 for each multiplying key and these pull rods are pivoted at 59, (see Fig. V,) to the bell crank levers 55, operate in the guide 52, and are provided at their rear ends with pins 60 adapted to be engaged by the stop arms 49 whereby upon the return movement of said stop arms the bell crank levers, the dogs 54, and the multiplying keys are returned to their normal positions.

*Carrying or transfer mechanism.*

The transfer mechanism or carrying mechanism to be used in connection with the machine described may be any one of a number of known types or forms adapted to the requirements of said machine. The general function of the transfer mechanism in a computing machine is to "carry" or transfer to a higher order any digit which belongs in said higher order, in order to increase the total of said higher order, the same as is done in the usual mental calculations where the various digits are written in long hand.

In the ordinary adding machine the digit to be carried or transferred never exceeds 1. Consequently it is customary to employ a "delayed transfer". In other words, each accumulator wheel is turned an amount which represents the total, in any given order or column, of the digits which have been added, neglecting the increase due to a total in the next lower order, in excess of 9. Therefore, after the accumulator wheels have rotated an amount sufficient to indicate the total for each order or column, it is necessary to advance certain wheels an additional amount in order to increase by one unit certain of the totals. Hence, the carrying is accomplished as the last step, and, therefore, there is a delayed transfer.

The main features of this delayed transfer may be used in connection with the machine described herein. A feature inherent in multiplying machines, however, which is not found in adding machines is that it is often necessary to carry more than 1; for example, 9 times 9 equals 81. In this case the 1 is the desired product in the lowest order and the 8 would have to be carried if there were other digits in the multiplicand.

In view of the necessity of carrying these larger numbers, I have designed, and prefer to use in the present machine, a novel carrying mechanism adapted to transfer rapidly and accurately these larger numbers. Furthermore, the transfer is not delayed but takes place simultaneously with the operation of accumulating the total. There are numerous important advantages in the mechanism adapted to perform this function. These advantages will be more fully pointed out in the following detailed description. While this novel carrying mechanism is particularly advantageous in connection with multiplying machines, it is not in any way limited to such use. In fact, its various advantages may find useful application in connection with various types of calculating or computing machines, as will be apparent.

In the mechanism selected for the purpose of illustrating the novel feature referred to, 61 designates a shaft extending transversely of the top extension 2 of the casing of my machine and located above the multiplying gear member 25. This shaft has loosely mounted upon it pinions 62 arranged in mesh with the teeth 26 of the multiplying gear member and alongside of which, upon said shaft, are transmission gear wheels 63 also loosely fitted to the shaft. Each transmission gear wheel is provided within its rim with ratchet teeth 64. Between the pinions 62 and the transmission gear wheels are arms 65 fixed to the pinions 62 and carrying pawls 66, the free ends of which are in engagement with the ratchet teeth of the transmission wheels. The pawls just mentioned serve to drive the transmission wheels in a forward direction when rotation is imparted to the pinions 62 by the multiplying gear members 25 in the upward movement of said multiplying gear members, and the pawls ride idly upon the ratchet teeth of the transmission wheels in retrograde rotation of the pinions upon the descent of the multiplying gear members.

67 designates a carriage located above the shaft 61 in the casing extension 2 and which is reciprocably supported for movement transversely of the machine by guide rods 68 mounted in the casing and upon which guide rollers 69 fixed to the carriage operate. The carriage 67 is provided with a rack 70 that is engaged by a pinion 71, (see Fig. VII,) carried by a shaft journaled in a hanger 72. The shaft just mentioned has fixed to it an escapement member 73 that is engaged by escapement pawls carried by an escapement arm 74 controlled by a spring 75. The escapement arm 74 is pivotally supported at 76 and is adapted to be moved in one direction by the spring 75 and in the opposite direction by a connecting rod 77 pivoted to a lever 78 extending from the arm. The connecting rod 77 is pivoted to a bell crank lever 79, (see Fig. II,) which also has pivoted to it a forwardly extending connecting rod 80 that is placed in connection with the stem of a shift key 81, (see Fig. I,) through the medium of a bell crank lever similar to the bell crank levers 8 that serve to unite the connecting rods 12 to the stems of the multiplicand keys 4. The carriage 67 is moved longitudinally in a direction transverse to the machine as a whole upon the actuation of the spacing key 81 and the operation of the escapement members through the medium of connections between said escapement members and spacing key by a spring motor arranged within a housing 82, (see Fig. VIII.) This housing is attached to the casing of the machine by a bracket arm 83. 84 is a tape connected to the spring motor within the housing 82 and attached at 85 to the carriage 67. The carriage 67 is adapted to be moved in a direction opposite to that in which it is moved by the spring motor by a finger lever 86, (see Figs. II, VII and VIII,) which is operable in a slot in the top of the casing of the machine and extends to the exterior of the casing in order that it may be readily engaged by the fingers of an operator for the purpose of retracting the carriage. The carriage 67 has extending longitudinally of it a shaft 87, the shaft being rigidly fitted to the ends of the carriage. This shaft serves as a support for numeral wheels and sets of numeral wheel operating gears that are in the main rotatably fitted to the shaft. In the drawings I have shown only three numeral wheels and three sets of operating gears, one of which is a "units'" set, another a "tens'" set, and a third a "hundreds'" set. Only this number of sets is shown for the reason that only two multiplying gear members 25 are illustrated in the drawings with one of which the "units'" set is coöperable and with the other of which the "tens'" set is coöperable, while the "hundreds'" set is designed to be operated by carrying action from the "tens'" set. It is obvious, however, that by the addition of any desired number of multiplying gear members 25 and a corresponding number of sets of numeral wheels coöperable with said multiplying gear members, my machine may be rendered serviceable in multiplying numbers to any desired degree.

Referring now in detail to the numeral wheels and the operating gears associated therewith upon the shaft 87. The "units'" set of numeral wheel gear members and the numeral wheel associated therewith are shown at the right hand side of Figs. VIII and IX. The carrying mechanism comprises a series of differential gears, one for each order. Referring to the right hand differential gear shown in Fig. IX: The bevel gear 88 is suitably held against rotation by any desired means; for example, it may be fixed to the shaft 87 which is non-rotatable. The annular gear immediately to the right of said bevel gear 88 has no function in this connection, but is formed integrally with said bevel gear 88, so that these combined elements, as manufactured, may be interchangeable with corresponding parts of the other differential gears. A hub 89 is loosely mounted upon the shaft 87 adjacent to the bevel gear wheel 88. This hub has radiating from it a plurality of spokes 90 on which are journaled bevel pinions 91. Three such spokes and pinions are illustrated. A transmission ring 92 is carried by said spokes, the spokes 90 and the bevel pinions 91 being arranged within the same. This transmission ring is toothed externally, whereby it may mesh with the teeth of the transmission gear 63 located beneath, but adapted to be operated by the multiplier gear member 25 at the "units'" side of the machine. Another bevel gear 94 is loosely mounted on the shaft 87 facing the bevel gear 88. Both gears 88 and 94 mesh with the bevel pinions 91. It will be apparent that with the bevel gear 88 stationary, rotation of the transmission ring 92 will cause the bevel gear 94 to rotate in the same direction at a rate twice as fast as the rotation of said transmission ring. It is also true that if the transmission ring were held stationary and the bevel gear 88 caused to rotate in one direction (assuming that the same is not fixed), the bevel gear 94 would rotate in the opposite direction at the same rate. It will be further apparent that the bevel gear 94 may be advanced in either of two ways,—by advancing the transmission ring or by moving backward the bevel gear 88. Furthermore, both such movements may occur simultaneously, whereupon the resulting movement of the bevel gear 94 will represent the sum of the two independent movements referred to. Consequently, if the rotation of the transmission ring 92 represents an accumulation or total of certain numbers which are being added, the bevel gear 94 will advance an amount proportional to such total. If at the same time a rearward movement be imparted to the bevel gear 88 representing a transfer or an amount carried from the lower order, it will be apparent that the bevel gear 94 will be advanced a still further amount, so that the first total will be increased the desired amount. Hence, the carrying may occur simultaneously with the totaling. The above general description applies to all three of the differential gears illustrated in Fig. IX, it being understood that bevel gear 88 is not free to rotate, but is fixed, rotation having been assumed above for the purpose of illustrating the principle of operation.

In the "units'" set of mechanism, in which the differential gears are included, the bevel pinions 91 serve merely as members to transmit movement from the transmission gear 92 to the bevel gear 94. 95 is a "units'" numeral wheel bearing numerals upon its periphery, (see Fig. VIII.) This "units'" numeral wheel is loosely mounted on the shaft 87 and is connected to the bevel gear 94 by any suitable means, such as a screw 97, (see Fig. IX.) Between the numeral wheel 95 and gear 94, and connected to said parts so as to rotate therewith, is a mutilated resetting wheel 98, to be hereinafter more particularly referred to. The numeral wheel and the resetting wheel turn with the bevel gear 84. The "units'" numeral wheel is provided with a hub sleeve 96 to which is rigidly connected a carrying disk 99, forming part of a "so-called Geneva stop mechanism" hereinafter described.

Referring now to the "tens'" and "hundreds'" numeral wheels and the sets of operating gears associated with these wheels upon the shaft 87. The "tens'" numeral wheel 100 and the "hundreds'" numeral wheel 101 are both loosely mounted on the shaft 87 and connected to the corresponding differential gear in a manner similar to that already described in connection with the "units'" numeral wheel 95. The same reference characters have been applied to the corresponding parts of the devices intended for the "units'" and for the "tens'" carrying means; the "units'" resetting wheel, for example, being designated 98 and the "tens'" resetting wheel being designated 98'.

At the side of the bevel gear 88 and fixed thereto facing the "units'" numeral wheel 95 is an internal or annular gear 102, similar to the annular gear previously described. This gear, however, while fixed to the bevel gear 88' is adapted to rotate. The corresponding annular gears for all of the higher orders are also adapted to rotate, the extreme right hand annular gear being the only one held against rotation. The object of these annular gears is to transmit movement to the differential gear from the next lower order, and as the right hand differential gear represents the lowest order, there is, of course, nothing to be transferred thereto. A carrying shaft 103 is supported by a bracket arm 104 fixed to the carriage 67 and arranged parallel with the shaft 87. This shaft has fixed to it at one end a pinion 105 in mesh with the internal gear wheel 102 and fixed to it at its opposite end a toothed carrying wheel 106 that is adapted to be engaged by a single tooth 99$^a$ at the periphery of the carrying disk 99 associated with the "units'" numeral wheel 95. To provide for the actuation of the pinion 105 when the carrying wheel 106 is rotated in one direction only by the carrying disk 99, I make the shaft 103 in section, the abutting ends of which are provided with ratchet teeth, as seen at 107, (Fig. IX,) and which will permit of the retrograde rotation of the shaft section bearing the carrying wheel 106 without movement being imparted to the shaft section bearing the pinion 105. This feature in the construction is of importance in connection with the operation of setting the operating gears of a numeral wheel of the denomination lower than that with which the pinion 105 is associated. It may be here stated that the carrying mechanism between the "tens'" and "hundreds'" numeral wheels in the machine and their operating gears is similar to that shown and described and that in view of this similarity it is deemed unnecessary to furnish further description relative thereto.

The operation of the carrying device is as follows:

Assume that eight units are to be carried from the "units'" differential gear to the "tens'" differential gear. This might occur, for example, in accumulating the product of 9 times 9 which is 81. The numeral wheel 98 if it started from zero would make eight complete revolutions, and in its final position would indicate 1 to the operator. The carrying disk 99 will have turned eight times and at each revolution will have advanced the gear 106 the distance of one tooth. Consequently, said gear, which has preferably 10 teeth, will be advanced eight teeth in a rearwardly direction; in other words, in a direction opposite to the forward rotation of the numeral wheel 98 and associated parts. As a result the shaft 103, the pinion 105, the annular gear 102 and the bevel gear 88' will be rotated rearwardly a distance corresponding to said eight teeth. Consequently, the bevel gear 94', the numeral wheel 100, the resetting gear 98' and the carrying disk 99' will all be rotated in a forward direction the same angular distance. Said numeral wheel 100 will, therefore, indicate a total eight units larger than would otherwise be the case. It will be noted that this carrying operation will take place independently of any simultaneous forward movement of the transmission ring 92'. Said transmission ring may be moving forwardly to indicate a product in the "tens'" order at the same time that the carrying device is transferring the eight units from the "units'" order. The final position of the numeral wheel 100 will, however, indicate the correct total.

The forward angular movement of the friction disk 99' due to the carrying of eight units may cause said disk to, in turn, operate the next transfer mechanism to carry on a certain amount into the "hundreds'" order. This might readily occur where said carrying disk does not happen to stand in initial position, but where it has been advanced either by a previous operation or by the simultaneous operation of the transmission ring 92'. In fact, the operation of the "units'" accumulating mechanism may necessitate the transfer of certain numbers throughout the entire series of differential gears up to the highest order. This transfer or tripping takes place practically instantaneously and through the positive engagement of the various parts, there being no friction devices to cause an error or no parts whose accurate operation may be impeded by their inertia when operating at a rapid rate. In other words, the operation is entirely positive, and the various carrying operations which may at times under given conditions be very complicated, all take place simultaneously and with great rapidity. But in a delayed transfer the operation of the mechanism in one order awaits the operation of a preceding lower order, so that the tripping may begin in the lowest order and then run through all the orders in succession with an appreciable delay. In my device the operation is practically instantaneous. Another feature of my differential transfer mechanism is that the same will carry backward as readily as it will carry forward and with the same accuracy and speed.

The transfer mechanism is not limited to the particular type of differential gear illustrated, as various other forms may be employed.

Resetting mechanism.

109, (see Figs. VII., VIII. and XII.,) designates a resetting gear wheel fixed to a shaft 110 mounted in the carriage 67. The shaft 110 is provided exteriorly of the casing with a suitable knob or handle by which it may be rotated and there are as many of the resetting gear wheels 109 as there are sets of numeral wheel operating gears, each resetting wheel being arranged to engage the resetting wheels 98, 98', or a corresponding resetting wheel associated with a set of the numeral wheel operating gears other than the "units'" and "tens'" sets. When the resetting gear wheels 109 are rotated, they act to rotate the resetting gear wheels 98, etc., upon the shaft 87 until the blank or untoothed portions of said resetting gear wheels, as seen in Fig. XII., are reached, and whereby the numeral wheels fixed to the last mentioned resetting wheels may be rotated to place the zero sign upon the numeral wheels, in alinement upon all of the wheels, and exposed to view through the sign opening 111 in the top of the casing of the machine, (see Figs. II. and VII.)

General operation.

In the practical use of my multiplying machine the multiplicand keys 4 to be used in the calculation are depressed as the first step in the operation of the machine to provide for the advancement of the pins 33, by the multiplicand key mechanism, toward the axes of the multiplying gear members 25 to distances governed by the values of the multiplicand keys for the purpose of governing the multiples in the calculation. The pins 33, which may properly be termed governing pins, are adapted to be actuated by the lift levers 28 to rotate the multiplying gear members 25 and it will be readily appreciated that if the pins are advanced only slightly, they will be remote from the axes of the multiplying gear members, and when the lift levers 28 are operated, the multiplying gear members will be rotated to only a slight degree, the degree of rotation of the multiplying gear members being increased according to the increased forward movements of the governing pins 33 before the lift levers are actuated. After the governing pins have been advanced toward the axes of the multiplying gear members, the multiplying gear members are rotated through the medium of the lift levers 28 and parts with which they are coöperable, namely, the shaft 47 operated by the hand lever 50 and the gears 48 on said shaft that mesh with the racks 30 of the lift levers. The degree to which the shaft 47 is rotated and consequently the degree to which the lift levers are elevated is regulated by the dogs 54 which are thrown into the paths of travel of the stop arms 49 on the shaft 47 when the multiplier keys 6 are depressed, and this part of the mechanism serves to govern the number of multiples in the calculation. Of course, I do not limit myself to a rotating multiplying member, as other movements may be employed.

To illustrate more particularly the operation of the machine, we will assume, for example, that it is desired to multiply the multiplicand 12 by the multiplier 14. The operator, as the first step in performing this calculation, depresses the multiplicand numeral key 4 at the "units'" side of the machine bearing the numeral "2" and the multiplicand key 4 at the "tens'" side of the machine bearing the numeral "1," whereby the shift bar 20 at the "units'" side of the machine would be moved forwardly the distance of two of the teeth of the rack bar 34 at the "units'" side, and the shift bar 20 at the "tens'" side would be moved forwardly the distance of one tooth upon the rack bar 34 at the "tens'" side. These shift bars then remain in positions to which they are moved, due to the engagement of the pawls 39 with the rack bars, and in their forward movements the pin 33 at the "units'" side would be placed one step nearer to the axis of the "units'" multiplying gear member 25 than the pin 33 associated with the multiplying gear member at the "tens'" side. The operator then depresses the multiplier key 6 bearing the numeral "4" so that the dog 54 associated with said key would be moved rearwardly and into the path of travel of the stop arm 49 on the shaft 47 located in proximity to said dog. He then, by a forward movement of the hand lever 50, rotates the shaft 47 until the stop arm just mentioned is brought into engagement with the dog 54 previously shifted. Upon the operation just described being carried out, the gears 48, by coöperating with the racks 30 of the lift levers 28 at the "units'" and "tens'" sides of the machine, work in mesh with the teeth of the racks 30. In so doing, the gears act to elevate said lift levers with the result of causing them to rotate the "units'" and "tens'" multiplying gear members 25 to degrees that are in effect multiples of the movements of the gears 48. As a consequence the "units'" and "tens'" multiplying gear members are moved to a degree that will provide for their actuating the transmission gear wheels distances governed by the degree of movement of the multiplying gear members and which, in the example of multiplying 12 by 4, would be the distance of eight teeth of the transmission gear wheel in mesh with the "units'" multiplying gear member, and four teeth on the next transmission wheel in mesh with the "tens'" multiplying gear member, thereby causing the "units'" and "tens'" numeral wheels to be so actuated by said transmission wheels as to indicate thereon the product 48, which is the product of 12 by 4. The operator then, in continuing the calculation, depresses the shift key 81 whereby the numeral wheel carriage is shifted to carry the transmission gear ring 92 associated with the "units'" numeral wheel out of engagement with the transmission gear wheel 63, the companion wheel 62 being in mesh with the multiplying gear member 25 at the "units'" side of the machine. The shifting of the carriage also moves the transmission gear ring associated with the "tens'" numeral wheel out of engagement with its corresponding gear wheel into engagement with the transmission gear wheel at the "units'" side. In a similar manner the transmission gear associated with the "hundreds'" numeral wheel is moved into engagement with the gear wheel at the "tens'" side of the machine. The "units'" numeral wheel is thereby placed out of operation and the calculation is continued upon the "tens'" and "hundreds'" numeral wheels. By this shifting operation the first partial product is moved to the right with respect to the following partial products thereby corresponding to the relative arrangement of the partial products when written in long hand. This arrangement will be clear from the following example:

```
    12
    14
    ──
    48
    12
    ───
   168
```

From the above illustration it will be seen that the partial product 48 is moved to the right relatively to the partial product 12, so that the 2 is in the same column as the 4.

In the further operation of the machine the final product is secured more directly than in the usual mental process. In the above example the partial product 12 is obtained as a distinct mental calculation, and the total product is then obtained by an additional operation, which consists in adding the two partial products. In this machine the partial product 12 is obtained and simultaneously added to the preceding partial product in the same columns, so that no corresponding third step of addition is necessary. In other words, the machine does not record the partial product 12, but simply increases the previous partial product 4 by 12 units so that the result is 16, and the 8 which is not increased at all appears in the total product unchanged, the final product being 168.

The operation in obtaining this combined partial product 12 and the total product is as follows: The operator depresses the multiplier key corresponding to the integer at the "tens'" side of the multiplier, causing the dog 54 associated with said key to move rearwardly and imparts rotation to the shaft 47 until the proper stop arm 49 on said shaft is moved into engagement with the dog just mentioned. The multiplying gear members 25 at both the "units'" and "tens'" sides of the machine are, therefore, elevated by the lift levers 28 through actuation by the gear 48 with the result of causing said multiplying gear members to actuate the transmission gear wheel 63 whereby the "tens'" and "hundreds'" numeral wheels are rotated distances corresponding to multiples of the multiplicand 12 and the multiplier 1. That is to say, the "tens'" transmission gear wheel is rotated the distance of two of its teeth and the "hundreds'" transmission gear wheel is rotated the distance of one of its teeth causing the "tens'" numeral wheel to be advanced two points and the "hundreds'" numeral wheel to be advanced one point. It will be seen that the numeral "8" originally appearing on the "units'" numeral wheel will at this time remain in appearance thereon due to this numeral wheel having been placed out of operation and the "tens'" numeral wheel which previously had in appearance thereon the numeral "4" to which has now been added two points will have in appearance thereon the numeral "6," and inasmuch as the "hundreds'" wheel has been rotated a single point it will have in appearance thereon the numeral "1," and that these numerals in their proper order will indicate the sum "168," the result of the multiplication of 12 by 14. The result upon the numeral wheels appears through the sight opening 111 in the casing of the machine and it is to be understood that the calculation has been assumed as taking place with the numeral wheels in the cleared condition.

It will be apparent that in the machine described there is but one device or combination of elements for determining the multiples of all digits for a given order. It will be further apparent that the scope of the multiplying operation need not be limited in any way to 9 times 9. In a machine such as described, it is convenient for commercial purposes to so limit it for a given order. The means for obtaining the product of 9 times 9 may, however, be readily extended almost indefinitely within the practical scope of any device in which they are embodied. Consequently, the product of any two given numbers may be obtained directly in the same manner in which the present machine obtains the product of 9 times 9 or smaller products. It will be further apparent from all of the preceding description that a machine embodying the principles of the invention is in no wise limited to the decimal system, but may be readily adapted to any other system.

The machine described herein includes only two rows of multiplicand keys and a correspondingly reduced number of associated parts for the purpose of simplifying the description and rendering the operation perfectly clear. The capacity of the machine may, of course, be increased to meet various commercial requirements.

It is to be understood that the invention is not limited to the particular embodiments or details of construction described, as these features were selected for the purpose of illustration only. Furthermore, the broad features of the invention are not limited to this type of computing machine, but may be embodied in various devices wherein it is desired to obtain quickly the result of certain mathematical calculations; computing scales, for example, illustrate one type of device depending on a mathematical operation. The various terms used in this specification are to be interpreted in a descriptive sense and not in a limiting sense. Furthermore, where certain alternative arrangements have been suggested, I do not desire to limit the scope of that particular phase of the invention to such alternative arrangements, but desire to include in all cases any suitable equivalent means for accomplishing the desired results as long as said means fall within the scope of the appended claims.

Having thus described my invention, what I claim as new and desire to secure by Letters Patent of the United States is:

1. A computing machine having multiplier and multiplicand keys, a movable member, means differentially adjustable along a given path and controlled by said multiplier keys, and means differentially adjustable along another given path and controlled by said multiplicand keys, said paths intersecting and said movable member having a differential movement determined by said intersection and being proportional to the product of any two numbers represented by the said keys.

2. In a computing mechanism, a determining member adapted to move about a pivotal axis from initial or zero position to successive angular positions, and means for moving from successive points along the line determining said initial position to said determining member along a plurality of parallel paths, whereby the travel along the said paths is proportional to their relative distances from said axis.

3. In a computing mechanism, a stop member adapted to move about a pivotal axis from initial or zero position to successive angular positions, and a member adapted to move from successive points along the line determining said initial position to said stop member along any one of a plurality of parallel paths, whereby the lengths of said paths are proportional to their relative distances from said axis.

4. In a computing mechanism, a stop member adapted to move about a pivotal axis from initial or zero position to successive angular positions, a member adapted to move from successive points along the line determining said initial position to said stop member along any one of a plurality of parallel paths, whereby the lengths of said paths are proportional to their relative distances from said axis, and multiplier keys for determining said angular positions.

5. In a computing mechanism, a stop member adapted to move about a pivotal axis from initial or zero position to successive angular positions, a member adapted to move from successive points along the line determining said initial position to said stop member along any one of a plurality of parallel paths, whereby the lengths of said paths are proportional to their relative distances from said axis, multiplier keys for determining said angular positions, and multiplicand keys for determining said successive points.

6. In a computing mechanism, a stop member adapted to move about a pivotal axis from initial or zero position to successive angular positions, a member adapted to move from successive points along the line determining said initial position to said stop member along any one of a plurality of parallel paths, whereby the lengths of said paths are proportional to their relative distances from said axis, multiplier keys for determining said angular positions, multiplicand keys for determining said successive points, and means for moving said member along the proper path.

7. In a computing mechanism, a stop member adapted to move about a pivotal axis from initial or zero position to successive angular positions, a member adapted to move from successive points along the line determining said initial position to said stop member along any one of a plurality of parallel paths, whereby the lengths of said paths are proportional to their relative distances from said axis, multiplier keys for determining said angular positions, multiplicand keys for determining said successive points, means for moving said member along the proper path, and an accumulator mechanism actuated by said member.

8. In a computing machine, nine multiplicand keys for each order, nine multiplier keys each adapted for all orders, a single positioning device for each order under the control of the multiplicand keys, a common positioning device for all orders, under the control of the multiplier keys, and a movable member for each order whose movement is determined by both of said positioning devices, the various movements of the different members being proportional to the product of the various multiplicand digits by the common multiplier.

9. In a computing machine, nine multiplicand keys for each order, nine multiplier keys each adapted for all orders, a positioning device for each order having nine successive positions controlled by the multiplier keys, a common positioning device for all orders having nine successive positions under the control of the multiplier keys, and a movable member for each order whose movement is determined by both of said positioning devices, the various movements of the different members being proportional to the product of the various multiplicand digits by the common multiplier.

10. In a computing machine, in combination, one set of coöperating elements for each order for determining the multiples of all digits, additional means adapted to move proportionally to said multiples, and further means for causing such movement.

11. In a computing machine, in combination, one means for each order for determining the multiples of all digits, additional means adapted to move proportionally to said multiples, and further means for transferring from the various orders to the successive higher orders to obtain a partial product.

12. In a computing machine, in combination, one set of coöperating means for each order for determining the multiples of all digits, means for moving proportionally to said multiples, and means for accumulating the partial products to obtain the final product.

13. In a computing machine, in combination, a series of relatively movable parts, there being one group of such parts for each order, and actuating mechanism for causing a relative movement of certain of said parts to determine the multiples of the various digits, the same parts moving in all cases to determine any multiple of any digit in a given order.

14. In a multiplying machine, a numeral wheel mechanism, a multiplier member having an axis for actuation of said numeral wheel mechanism, a governing member for direct actuation of said multiplier member and which is movable toward and away from the axis of said multiplier member to provide for the actuation thereof in differential degrees, and means for operating said governing member to cause it to impart movement to said multiplier member.

15. In a multiplying machine, a numeral wheel mechanism, a multiplier member having an axis for actuation of said numeral wheel mechanism, a governing member for direct actuation of said multiplier member and which is movable toward and away from the axis of said multiplier member to provide for the actuation thereof in differential degrees, means for operating said governing member to cause it to impart movement to said multiplier member, and means for regulating the degree of operation of said last named means.

16. In a multiplying machine, a numeral wheel mechanism, a multiplier member having an axis for actuating said numeral wheel mechanism, a shiftable governing member for operating said multiplier member, means for shifting said governing member relative to the axis of said multiplier member, means for operating said governing member to cause it to operate said multiplier member, and means for governing the degree of movement of said last named means.

17. In a multiplying machine, a numeral wheel mechanism, a multiplier member having an axis for actuating said numeral wheel mechanism, a shiftable governing member for operating said multiplier member, key actuated means for shifting said governing member relative to the axis of said multiplier member, means for operating said governing member to cause it to operate said multiplier member, and means for governing the degree of movement of said last named means.

18. In a multiplying machine, a numeral wheel mechanism, a multiplier member having an axis for actuating said numeral wheel mechanism, a shiftable governing member for operating said multiplier member, means for shifting said governing member relative to the axis of said multiplier member, means for operating said governing member to cause it to operate said multiplier member, and key controlled means for governing the degree of movement of said last named means.

19. In a multiplying machine, a numeral wheel mechanism, a rotatable multiplier member having an axis for actuating said numeral wheel mechanism, a shiftable governing member for operating said multiplier member, means for shifting said governing member relative to the axis of said multiplier member, means for retaining said governing member in a set position, means for operating said governing member to operate said multiplier member, and means for governing the degree of movement of said last named means.

20. In a multiplying machine, a numeral wheel mechanism, a rotatable multiplier member for actuating said numeral wheel mechanism, a governing member for operating said multiplier member and which is shiftable relative to the axis of said multiplier member, key actuated means for shifting said governing member, means for operating said governing member to operate said multiplier member, and means for governing the degree of movement of said last named means.

21. In a multiplying machine, a numeral wheel mechanism, a multiplier member having an axis for actuating said numeral wheel mechanism, a governing member shiftable relative to the axis of said multiplier member and by which said multiplier member is operated, a lever coöperable with said governing member to cause it to operate said multiplier member, means for operating said lever, and means for governing the degree of operation of said lever operating means.

22. In a multiplying machine, a numeral wheel mechanism, a multiplier member having an axis for actuating said numeral wheel mechanism, a governing member shiftable relative to the axis of said multiplier member and by which said multiplier member is operated, a lever for operating said governing member to cause it to operate said multiplier member, means for operating said lever, and key actuated means for governing the degree of operation of said lever operating means.

23. In a multiplying machine, a numeral wheel mechanism, a multiplier member having an axis for actuating said numeral wheel mechanism, a governing member shiftable relative to the axis of said multiplier member and coöperable therewith, means for shifting said governing member, a lever coöperable with said governing member to operate said multiplier member, a shaft geared to said lever, and means for governing the degree of rotation of said shaft and the degree of movement of said multiplier member.

24. In a multiplying machine, a numeral wheel mechanism, a multiplier member having an axis for actuating said numeral wheel mechanism, a governing member shiftable relative to the axis of said multiplier member and coöperable therewith, means for shifting said governing member, a lever coöperable with said governing member to operate said multiplier member, a shaft geared to said lever, and key actuated means for governing the degree of rotation of said shaft and the degree of movement of said multiplier member.

25. In a multiplying machine, a numeral wheel mechanism, a multiplier member having an axis for actuating said numeral wheel mechanism, a governing member shiftable relative to the axis of said multiplier member and coöperable therewith, means for shifting said governing member, a lever coöperable with said governing member to operate said multiplier member, a shaft geared to said lever, and key actuated dogs arranged for movement relative to said shaft, said shaft being provided with stop arms arranged for movement with said dogs to limit the degree of rotation of said shaft.

26. In a multiplying machine, a numeral wheel mechanism, a multiplier member having an axis for actuating said numeral wheel mechanism, a governing member shiftable relative to the axis of said multiplier member and coöperable therewith, means for shifting said governing member, a lever coöperable with said governing member to operate said multiplier member, a shaft geared to said lever, and key actuated dogs arranged for movement relative to said shaft, said shaft being provided with a plurality of stop arms in staggered relation relative to each other and arranged for movement with said key actuated dogs.

27. In a multiplying machine, a numeral wheel mechanism, an oscillating multiplier gear member for actuating said numeral wheel mechanism, a governing pin coöperable with said multiplier gear member, a shift bar for moving the pin toward the axis of said multiplier gear member, key actuated means for moving said shift bar, means for actuating said governing pin to rotate said multiplier gear member, and means for governing the degree of movement of said last named means.

28. In a multiplying machine, a numeral wheel mechanism, an oscillating multiplier gear member for actuating said numeral wheel mechanism, a governing pin coöperable with said multiplier gear member, a shift bar for moving said governing pin toward the axis of said multiplier gear member, key actuated means for moving said shift bar, means for actuating said governing pin to rotate said multiplier gear member, and key controlled means for governing the degree of movement of said multiplier gear member.

29. In a multiplying machine, a numeral wheel mechanism, an oscillating multiplier gear member for actuating said numeral wheel mechanism, a governing pin coöperable with said multiplier gear member, a shift bar for moving said governing pin toward the axis of said multiplier gear member, key actuated means for moving said shift bar, a lever for coöperation with said governing pin, a shaft geared to said lever and provided with a series of stop arms, and means adapted to be engaged by said stop arms to govern the degree of rotation of said shaft.

30. In a multiplying machine, a numeral wheel mechanism, an oscillating multiplier gear member for actuating said numeral wheel mechanism, a governing pin coöperable with said multiplier gear member, a shift bar for moving said governing pin toward the axis of said multiplier gear member, key actuated means for moving said shift bar, a lever for coöperation with said governing pin, a shaft geared to said lever and provided with a series of stop arms, and key actuated means to receive the engagement of said stop arms to govern the degree of rotation of said shaft.

31. In a multiplying machine, a numeral wheel mechanism, an oscillating multiplier gear member for actuating said numeral wheel mechanism, a governing pin coöperable with said multiplier gear member, a shift bar for moving said governing pin toward the axis of said multiplier gear member, key actuated means for moving said shift bar, a lever for coöperation with said governing pin, a shaft geared to said lever and provided with a series of stop arms, a plurality of dogs shiftable into the paths of travel of said stop arms to govern the degree of rotation of said shaft, and keys for actuating said dogs.

32. In a multiplying machine, a numeral wheel mechanism, an oscillating multiplier gear member for actuating said numeral wheel mechanism, a governing pin coöperable with said multiplier gear member, a shift bar for moving said governing pin, a lever for actuating said shift bar, a series of keys having connection with said lever, means for actuating said governing pin to oscillate said multiplier gear member, and means for governing the degree of movement of said last named means.

33. In a multiplying machine, a numeral wheel mechanism, an oscillating multiplier gear member for actuating said numeral wheel mechanism, a governing pin coöperable with said multiplier gear member, a shift bar for moving said governing pin, a lever for actuating said shift bar, a series of keys having connection with said lever, means for actuating said governing pin to oscillate said multiplying gear member, and key actuated means for governing the degree of oscillation of said multiplier gear member.

34. In a multiplying machine, a numeral wheel mechanism, an oscillating multiplier gear member for actuating said numeral wheel mechanism, a governing pin coöperable with said multiplier gear member, a shift bar for moving said governing pin, a lever for actuating said shift bar, a series of keys having connection with said lever, a lift lever coöperable with said governing pin, means for operating said lift lever, and key actuated means for governing the degree of movement of said lift lever.

35. In a multiplying machine, a numeral wheel mechanism, an oscillating multiplier gear member for actuating said numeral wheel mechanism, a governing pin coöperable with said multiplier gear member, a shift bar for moving said governing pin, a lever for actuating said shift bar, a series of keys having connection with said lever, a detent for holding said shift bar after it has been shifted to move said governing pin, means for actuating said governing pin to rotate said multiplier gear member, and means for governing the degree of movement of said multiplier gear member.

36. In a multiplying machine, a numeral wheel mechanism, an oscillating multiplier gear member for actuating said numeral wheel mechanism, a governing pin coöperable with said multiplier gear member, a shift bar for moving said governing pin, a lever for actuating said shift bar, a series of keys having connection with said lever, a detent for holding said shift bar after it has been shifted to move said governing pin, means for actuating said governing pin to rotate said multiplier gear member, means for governing the degree of movement of said multiplier gear member, and mechanism for releasing said detent from said shift bar.

37. In a multiplying machine, a numeral wheel mechanism, an oscillating multiplier gear member for actuating said numeral wheel mechanism, a lift lever adjacent to said multiplier gear member, a governing pin slidably fitted to said multiplier gear member and said lift lever, a shift bar fitted to said governing pin, key actuated means for operating said shift bar, a shaft geared to said lift lever for imparting movement to said governing pin and multiplier gear member, and key actuated means for governing the degree of movement of said shaft, lift lever, and multiplier gear member.

38. In a multiplying machine, a numeral wheel mechanism, an oscillating multiplier gear member for actuating said numeral wheel mechanism, a lift lever adjacent to said multiplier gear member, a governing pin slidably fitted to said multiplier gear member and said lift lever, a shift bar fitted to said governing pin, key actuated means for operating said shift bar, a shaft geared to said lift lever for imparting movement to said governing pin and multiplier gear member, key actuated means for governing the degree of movement of said shaft, lift lever and multiplier gear member, and an accumulator coöperating with said multiplier gear member.

JOHN P. CLULEY.

In the presence of—
H. G. COOK,
E. B. LINN.